(12) United States Patent
Tani

(10) Patent No.: US 8,575,821 B2
(45) Date of Patent: Nov. 5, 2013

(54) PIEZOELECTRIC ACTUATOR AND PIEZOELECTRIC ACTUATOR ARRAY

(75) Inventor: Makoto Tani, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 34 days.

(21) Appl. No.: 13/408,253

(22) Filed: Feb. 29, 2012

(65) Prior Publication Data
US 2012/0223619 A1    Sep. 6, 2012

(30) Foreign Application Priority Data
Mar. 2, 2011 (JP) .................................. 2011-045523

(51) Int. Cl.
*H01L 41/08* (2006.01)

(52) U.S. Cl.
USPC ....................................... 310/323.02; 310/328

(58) Field of Classification Search
USPC ............................................. 310/328, 323.02
See application file for complete search history.

(56) References Cited

U.S. PATENT DOCUMENTS

| | | | |
|---|---|---|---|
| 5,027,028 A * | 6/1991 | Skipper .......................... | 310/328 |
| 5,345,137 A | 9/1994 | Funakubo et al. | |
| 6,046,526 A * | 4/2000 | Maruyama ................. | 310/323.06 |
| 6,051,911 A * | 4/2000 | Kojima et al. ................. | 310/366 |
| 6,066,911 A * | 5/2000 | Lindemann et al. ...... | 310/323.02 |
| 6,933,657 B2 * | 8/2005 | Maruyama et al. ........... | 310/328 |
| 7,521,839 B2 * | 4/2009 | Mori ......................... | 310/323.02 |

FOREIGN PATENT DOCUMENTS

| | | |
|---|---|---|
| JP | 05-146171 A1 | 6/1993 |
| JP | 2006-238644 A1 | 9/2006 |

* cited by examiner

*Primary Examiner* — Mark Budd
(74) *Attorney, Agent, or Firm* — Burr & Brown

(57) ABSTRACT

A piezoelectric actuator 10 according to each embodiment of the present invention comprises: a column-like piezoelectric body 31, whose bottom face is fixed to a base portion 20, and which stands from the base portion; and a driving power supply section for applying a driving voltage to the piezoelectric body. The piezoelectric body includes two sets (32, 33) of a pair of electrodes for providing electrical fields to the piezoelectric body. The two sets are formed so that each of the two sets is provided to each of two regions into which the piezoelectric body is divided by a virtual plane VPL1 parallel to the center axis CL of the piezoelectric body. The driving power supply section applies the driving voltage Vin having a "frequency between the second-order bending resonant frequency and the first-order expansion-contraction resonant frequency" to either one of the two sets, selectively.

8 Claims, 10 Drawing Sheets

(A)

(B)

PIEZOELECTRIC ACTUATOR AND PIEZOELECTRIC ACTUATOR ARRAY

BACKGROUND OF THE INVENTION

1. Field of the Invention

The present invention relates to: a piezoelectric actuator, including a column-like piezoelectric body and a driving power supply section, for moving a movable body by using mechanical vibration generated on a top face of the piezoelectric body; and a piezoelectric actuator array in which the piezoelectric actuators are arranged in a lattice pattern.

2. Description of Related Art

One of conventional piezoelectric actuators (hereinafter, referred to as a "first conventional device") comprises a quadrangular column-like layered piezoelectric element. The first conventional device displaces a friction member contacting with a movable body (round body) by having the layered piezoelectric element undergo bending deformation and shear deformation, to thereby rotate the movable body owing to the displacement of the friction member. The first conventional device applies a voltage to the layered piezoelectric element in such a manner that a speed of the friction member when it is moving in a first direction is different from a speed of the friction member when it is moving in a second direction (refer to Japanese Patent Application Laid-Open No, 2006-238644).

However, according to the first conventional device, it is necessary to enlarge the bending deformation and the shear deformation in order to move the movable body rapidly, and thus, it is necessary to enlarge a height of the layered piezoelectric element. Consequently, it has a problem that a size of the piezoelectric actuator is large.

Another of the conventional piezoelectric actuators (hereinafter, referred to as a "second conventional device") has a specific feature in an inner electrode of a column-like layered piezoelectric body. The second conventional device generates a bending vibration at an upper portion of the layered piezoelectric body, and simultaneously generates an expansion and contraction at a lower portion of the layered piezoelectric body, to thereby move the movable body by having a tip of the layered piezoelectric body move in an elliptical orbit (refer to Japanese Patent Application Laid-Open Hei No. 5-146171).

However, the second conventional device needs to have a driving circuit for applying to the layered piezoelectric element a driving voltage to cause the bending vibration, and another driving circuit for applying to the layered piezoelectric element another driving voltage to cause the expansion/contraction vibration, separately. Consequently, it has a problem that the number of the driving circuits becomes large.

SUMMARY OF THE INVENTION

One of objects of the present invention is to provide a piezoelectric actuator, whose length in height is small, and which can reduce the number of the driving circuits.

One of piezoelectric actuators of the present invention (hereinafter, also referred to as a "first piezoelectric actuator") comprises: a column-like piezoelectric body, whose bottom face (one end) is fixed to a base portion, and which stands from the base portion; and a driving power supply section; to move a movable body by using mechanical vibration generated on a top face (the other end, a face opposed to the bottom face) of the piezoelectric body.

The piezoelectric body includes two sets of a pair of electrodes for applying electrical fields to the piezoelectric body. Further, the two sets of a pair of electrodes are formed in such a manner that one set of the two sets is provided to one of two regions into which the piezoelectric body is divided by a plane parallel to the center axis of the piezoelectric body, and the other set of the two sets is provided to the other of the two regions (i.e., the one set of a pair of electrodes per the one region).

Further, the driving power supply section is configured so as to apply a driving voltage having a "frequency between the second-order bending resonant frequency and the first-order expansion-contraction resonant frequency" of the piezoelectric body to either one set of the two sets of a pair of electrodes or the other set of the two sets of a pair of electrodes, selectively. That is, when the driving voltage is applied to one set of the two sets of a pair of electrodes, the driving voltage is not applied to the other set of the two sets of a pair of electrodes.

According to the configuration described above, since the frequency of the driving voltage is between the second-order bending resonant frequency of the piezoelectric body and the first-order expansion-contraction resonant frequency of the piezoelectric body, when the driving voltage is applied to one pair of the two pairs of electrodes, a "vibration in which the bending vibration and the expansion-contraction vibration are superimposed with each other" is generated in the piezoelectric body. Consequently, for example, as shown by an arrow Ar1 in (C) of FIG. 6, the top face of the piezoelectric body vibrates in an oblique direction with respect to the center axis of the piezoelectric body (inclined direction, first direction) so that the movable body is moved by the vibration.

Similarly, when the driving voltage is applied to the other one pair of the two pairs of electrodes, the "vibration in which the bending vibration and the expansion-contraction vibration are superimposed with each other" is generated in the piezoelectric body. Consequently, for example, as shown by an arrow Ar2 in FIG. 7, the top face of the piezoelectric body vibrates in an oblique direction with respect to the center axis of the piezoelectric body (inclined direction, second direction different from the first direction) so that the movable body is moved by the vibration.

In this way, the first piezoelectric actuator is driven by the driving voltage having the "frequency between the second-order bending resonant frequency and the first-order expansion-contraction resonant frequency", and therefore, the bending vibration of the piezoelectric body is close to a bending vibration at the second-order bending resonance, and the expansion-contraction vibration of the piezoelectric body is close to an expansion-contraction vibration at the first-order expansion-contraction vibration. Accordingly, the amplitudes of these vibrations can be large, and thus, there is not a big need to enlarge the height of the piezoelectric body (piezoelectric element). Further, the first piezoelectric actuator needs to include only a single driving power supply section (driving circuit) which generates the driving voltage having the "frequency between the second-order bending resonant frequency and the first-order expansion-contraction resonant frequency of the piezoelectric body", and thus, the number of the drive circuits can be reduced.

Another of the piezoelectric actuators of the present invention (hereinafter, also referred to as a "second piezoelectric actuator") comprises, similarly to the first piezoelectric actuator, a column-like piezoelectric body, whose bottom face (one end) is fixed to a base portion, and which stands from the base portion; and a driving power supply section; to move a movable body by using mechanical vibration generated on a top face (the other end, a face opposed to the bottom face) of the piezoelectric body.

The piezoelectric body comprises four sets of a pair of electrodes, the four sets being for applying electrical fields to the piezoelectric body. Further, each of the four sets of a pair of electrodes is provided to each of four regions into which the piezoelectric body is divided by two planes that are parallel to the center axis of the piezoelectric body and intersect with each other (i.e., the one pair of electrodes per the one region of the four regions).

Further, the driving power supply section is configured so as to apply a driving voltage having a "frequency between the second-order bending resonant frequency and the first-order expansion-contraction resonant frequency" of the piezoelectric body to any (arbitrary) two sets of the four sets of a pair of electrodes, selectively, the arbitrary two sets being formed in any (arbitrary) two regions that are adjacent to each other of the four regions. That is, when the driving voltage is applied to two sets of the four sets of a pair of electrodes, the driving voltage is not applied to the other two sets of the four sets of a pair of electrodes.

According to the configuration described above, a "vibration in which the bending vibration and the expansion-contraction vibration are superimposed with each other" is generated in the piezoelectric body. Consequently, the top face of the piezoelectric body vibrates in any one of four directions, depending on the selected two sets of a pair of electrodes.

Further, similarly to the first piezoelectric actuator, the second piezoelectric actuator is driven by the driving voltage having the "frequency between the second-order bending resonant frequency and the first-order expansion-contraction resonant frequency", and therefore, the bending vibration of the piezoelectric body is close to a bending vibration at the second-order bending resonance, and the expansion-contraction vibration of the piezoelectric body is close to an expansion-contraction vibration at the first-order expansion-contraction vibration. Accordingly, amplitudes of these vibrations can be large, and thus, there is not a big need to enlarge the height of the piezoelectric body (piezoelectric element). Further, the second piezoelectric actuator needs to include only a single driving power supply section (driving circuit) which generates the driving voltage having the "frequency between the second-order bending resonant frequency and the first-order expansion-contraction resonant frequency" of the piezoelectric body, and thus, the number of the drive circuits can be reduced.

In those piezoelectric actuators, it is preferable that the piezoelectric body be a square column, and be adjusted in such a manner that a ratio H/L of a height H of the piezoelectric body to a length L of one of sides of the bottom face of the piezoelectric body is "equal to or larger than 1 and equal to or smaller than 2". According to this configuration, the second-order bending resonant frequency can be made closer to the first-order expansion-contraction resonant frequency (refer to FIG. 8). This will allow the bending vibration of the piezoelectric body to become closer to the bending vibration at the second-order bending resonance, and will allow the expansion-contraction vibration of the piezoelectric body to become closer to the expansion-contraction vibration at the first-order expansion-contraction vibration. Consequently, the amplitudes of these vibrations can be larger, and thus, it is possible to more greatly reduce a height of the piezoelectric body (piezoelectric element).

It should be noted that each of the first and second piezoelectric actuators can be used as an actuator array in which the piezoelectric actuators are arranged (disposed) so as to lie adjacent to each other with a substantially constant interval in a longitudinal direction and in a transverse direction (i.e., in a lattice pattern).

BRIEF DESCRIPTION OF THE DRAWINGS

Other and further objects, features, and advantages of the present invention will be apparent from following description on each of embodiments of the present invention, taken in consideration with the accompanying drawings in which.

DETAILED DESCRIPTION OF THE INVENTION

Next will be described a piezoelectric actuator according to each of embodiments of the present invention with reference to the drawings.

The piezoelectric actuator according to each of the embodiments can be applied to, but not limited to, lithography equipment, positioning stages, camera lens moving apparatuses, and so on.

<First Embodiment>

(Structure)

Figure 1:
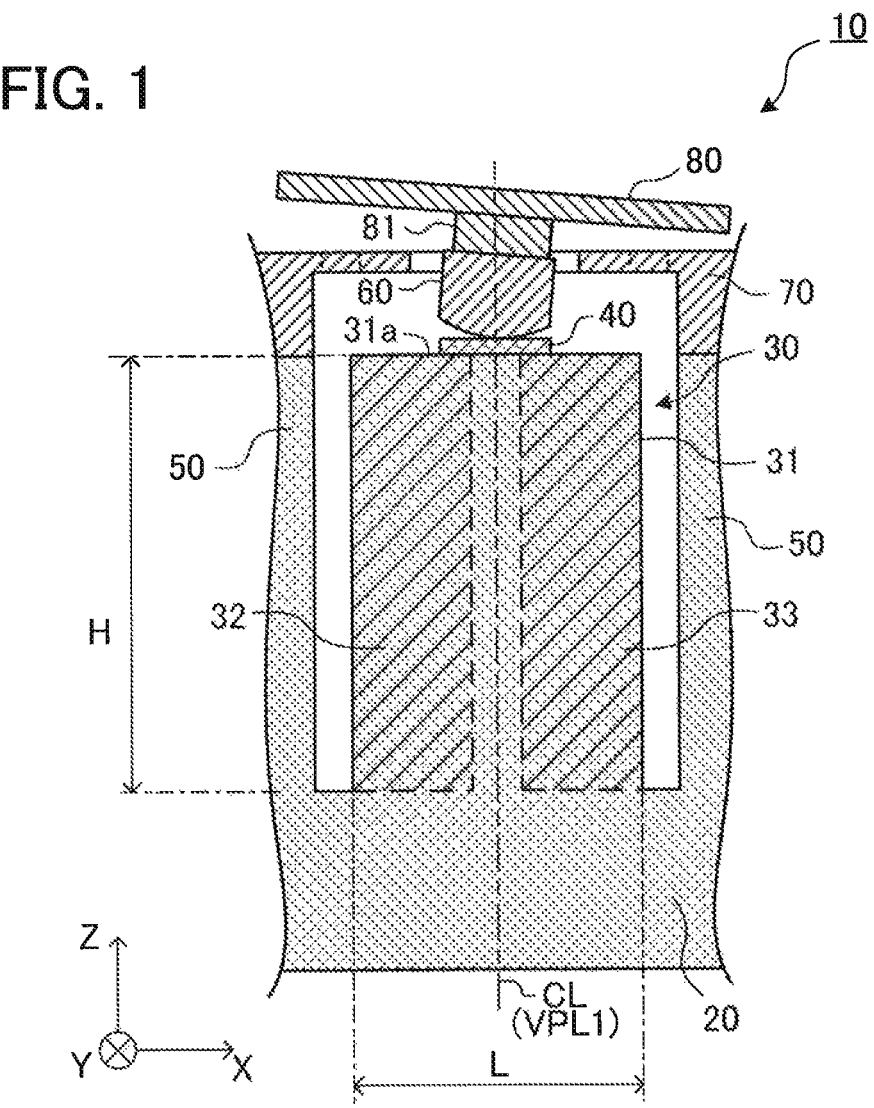
FIG. 1 is a schematic sectional view of a piezoelectric actuator according to a first embodiment of the present invention.
Figure 2:
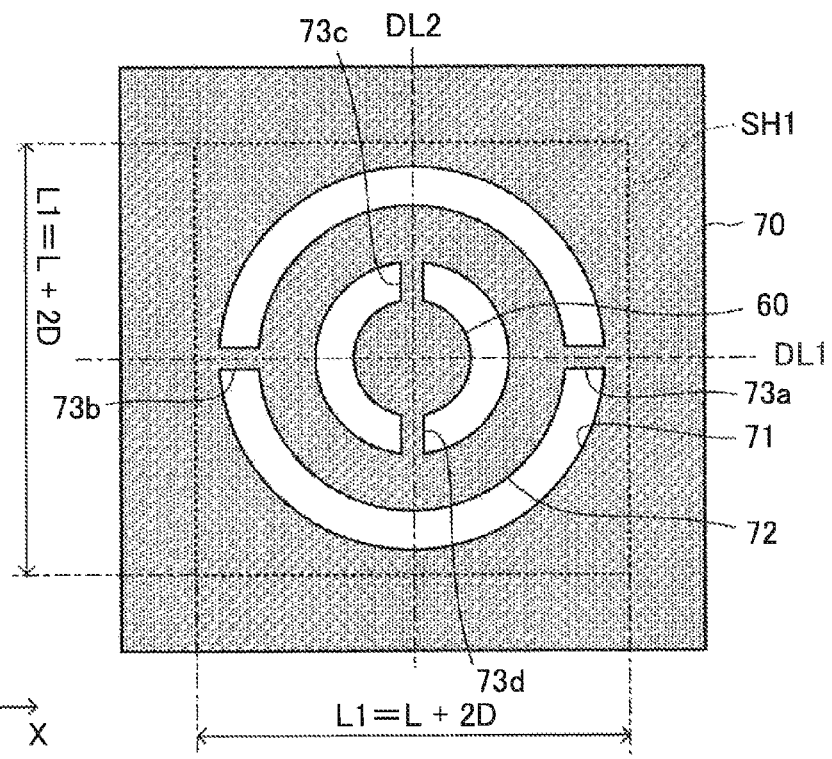
FIG. 2 is a plan view of the movable body holding member and the movable body, shown in FIG. 1.
Figure 3:
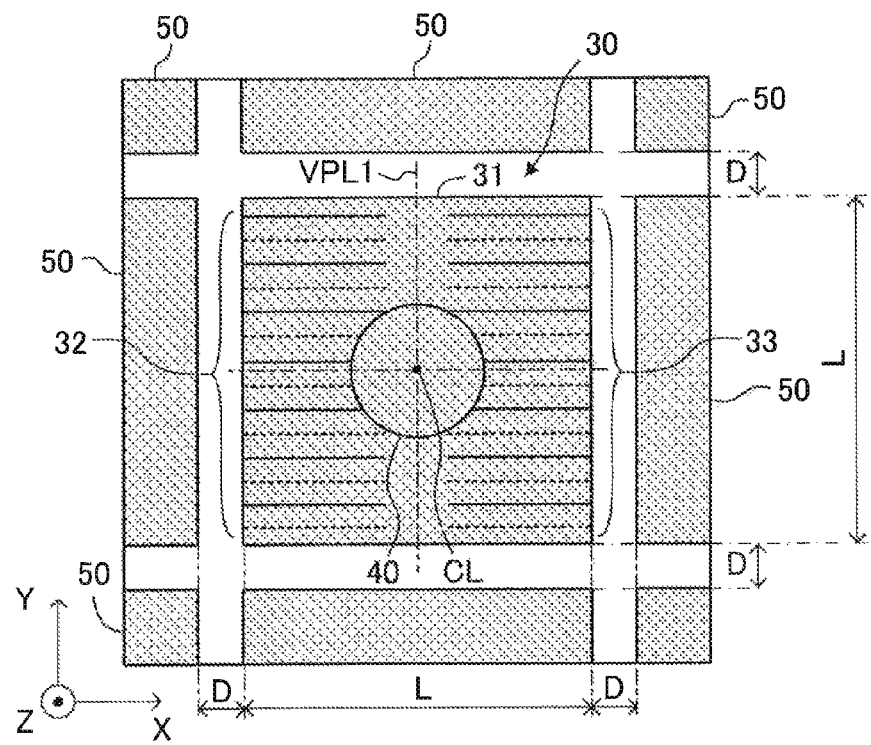
FIG. 3 is a plan view of the piezoelectric element, the driving element, and the holding member supporting portion, shown in FIG. 1.

As shown in FIGS. 1-3, a piezoelectric actuator 10 according to a first embodiment of the present invention includes a base portion 20, a piezoelectric element 30, a driving element 40, a holding member supporting portion 50, a movable body (swivel body) 60, a movable body holding member 70, and a mirror 80.

Figure 12:
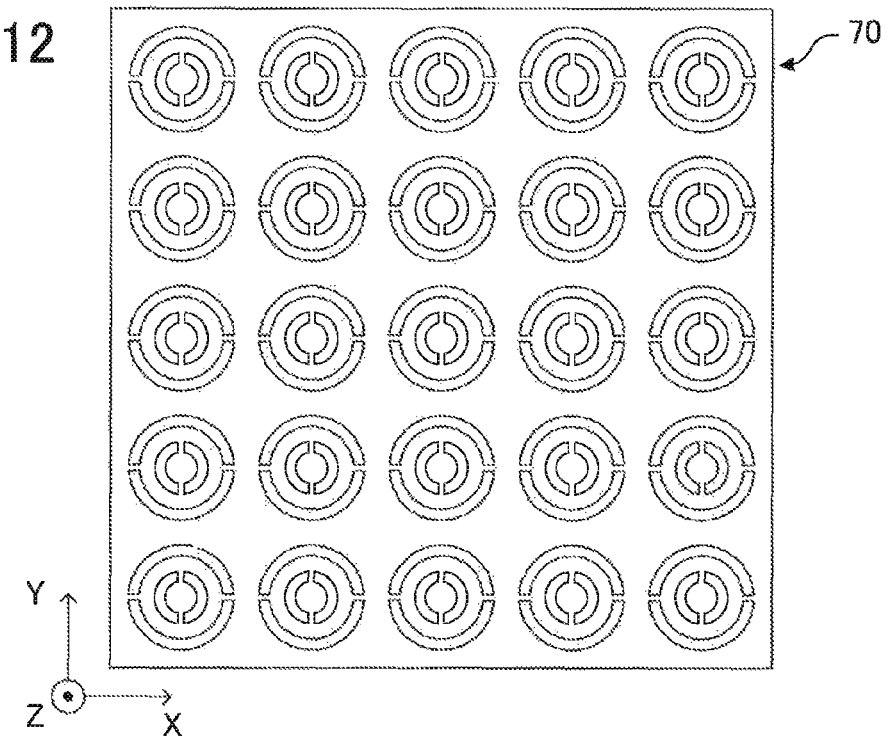
FIG. 12 is a plan view of "a movable body holding member and a movable body" which are used to array the piezoelectric actuator according to the second embodiment of the present invention.
Figure 13:
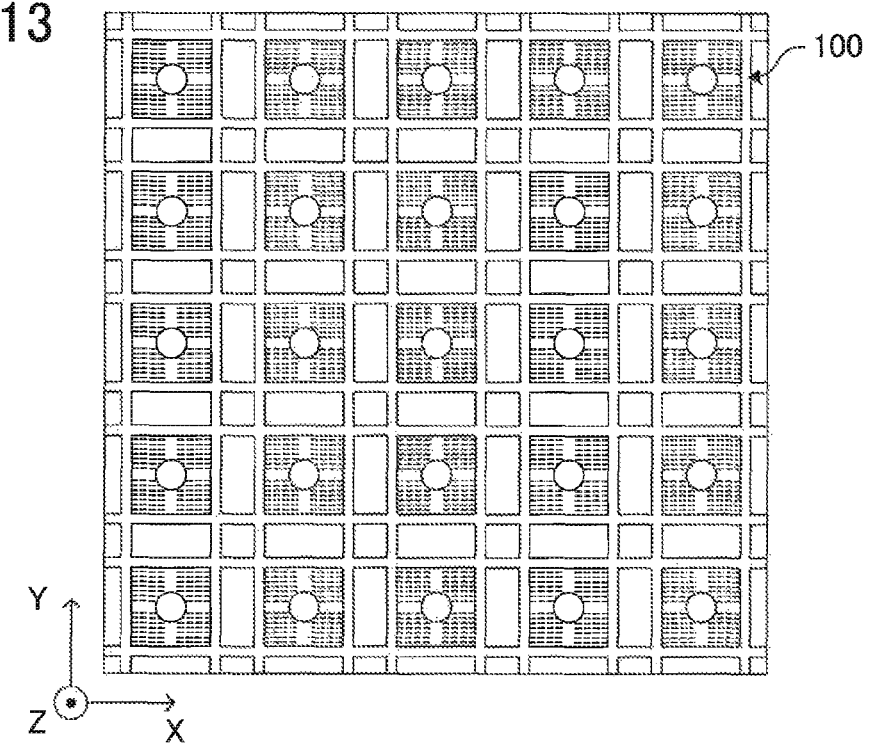
FIG. 13 is a plan view of "a piezoelectric element, a driving element, and a holding member supporting portion" which are used to array the piezoelectric actuator according to the second embodiment of the present invention.

As understood from FIGS. 12 and 13, the piezoelectric actuators 10 can be manufactured as an actuator array in which a plurality of the piezoelectric actuators 10 are arranged (disposed) so as to lie adjacent to each other with a substantially constant interval in a longitudinal direction and in a transverse direction (i.e., a plurality of the piezoelectric actuators 10 are arranged so as to be in a matrix or lattice pattern). Hereinafter, a single piezoelectric actuator 10 is described.

The piezoelectric element 30 comprises a square column-like piezoelectric body 31 and two sets of electrode layer groups 32, 33. A bottom face (one end) of the piezoelectric body 31 (piezoelectric elements 30) is fixed to and is integrated with (or unified with) the base portion 20. That is, the piezoelectric element 30 includes the "column-like piezoelectric body 31", whose one end is fixed to the base portion 20, which stands from the base portion 20, and whose other end is open.

The piezoelectric body 31 is a fired (sintered) body made of a piezoelectric material such as lead zirconate titanate (PZT) 21, and the like. A side along a height direction of the piezoelectric body 31 extends along a Z-axis among "X, Y, and the Z axes, orthogonal to each other". Accordingly, the center axis CL of the piezoelectric body 31 is parallel to the Z-axis. As shown in FIG. 3, a shape of the piezoelectric body 31 (planar shape of the piezoelectric body 31) when the piezoelectric body 31 is viewed along the center line CL (or the Z-axis) is a square having sides parallel to the X-axis and sides parallel to the Y-axis. A height of the piezoelectric body 31 is "H", and a length of each of the sides of the bottom face and a top face of the piezoelectric body 31 is "L". The piezoelectric body 31 is polarized in a Y-axis positive direction.

As shown in FIG. 3, the electrode layer group 32 includes: a plurality of first electrode layers shown by solid lines; and a plurality of second electrode layers shown by broken lines. The electrode layer group 32 is formed in one of two regions (i.e., region in an X-axis negative direction (left side) with respect to a virtual plane VPL1 in FIG. 3). The two regions are formed by dividing the piezoelectric body 31 into two portions by (with) the "virtual plane VPL1, which is a virtual plane including the center axis CL, and is parallel to a Z-Y plane".

A plurality of the first electrode layers of the electrode layer group 32 are electrically connected (with each other) by an unillustrated first connection layer. A plurality of the second electrode layers of the electrode layer group 32 are electrically connected (with each other) by an unillustrated second connection layer. A layer surface of each of the first electrode layers is parallel to the Z-X plane. A layer surface of each of the second electrode layers is also parallel to the Z-X plane. Accordingly, the first electrode layer and the second electrode layer are parallel to each other. Each of heights (lengths in the Z-axis direction) of the first electrode layers is slightly smaller than the height H of the piezoelectric body 31. Each of heights of the second electrode layers is slightly smaller than the height H of the piezoelectric body 31. Each of widths (lengths in the X-axis direction) of the first electrode layers is slightly smaller than half (L/2) of the length L of the base of the piezoelectric body 31. Each of widths of the second electrode layers is slightly smaller than half (L/2) of the length L of the base of the piezoelectric body 31. The first electrode layer and the second electrode layer are arranged alternately so as to be opposed to each other. Therefore, the electrode layer group 32 can be said to be as a "pair of electrodes consisting of the first electrode layer and the second electrode layer".

The electrode layer group 33 includes: a plurality of third electrode layers shown by solid lines; and a plurality of fourth electrode layers shown by broken lines. The electrode layer group 33 is formed in the other one of the two regions (i.e., region in an X-axis positive direction (right side) with respect to the virtual plane VPL1 in FIG. 3), into which the piezoelectric body 31 is divided by (with) the virtual plane VPL1.

A plurality of the third electrode layers of the electrode layer group 33 are electrically connected (with each other) by an unillustrated third connection layer. A plurality of the fourth electrode layers of the electrode layer group 33 are electrically connected (with each other) by an unillustrated fourth connection layer. A surface of each of the third electrode layers is parallel to the Z-X plane. A surface of each of the fourth electrode layers is also parallel to the Z-X plane. Accordingly, the third electrode layer and the fourth electrode layers are parallel to each other. Each of heights (lengths in the Z-axis direction) of the third electrode layers is slightly smaller than the height H of the piezoelectric body 31. Each of heights of the fourth electrode layers is slightly smaller than the height H of the piezoelectric body 31. Each of widths (lengths in the X-axis direction) of the third electrode layers is slightly smaller than half (L/2) of the length L of the base of the piezoelectric body 31. Each of widths of the fourth electrode layers is slightly smaller than half (L/2) of the length L of the base of the piezoelectric body 31. The third electrode layer and the fourth electrode layer are arranged alternately so as to be opposed to each other. Therefore, the electrode layer group 33 can be said to be as a "pair of electrodes consisting of the third electrode layer and the fourth electrode layer". Accordingly, the piezoelectric element 30 can be said to have two sets (32, 33) of a pair of electrodes for applying electrical fields to the piezoelectric body 31.

The driving element 40 is made of an abrasion-resistant metallic material such as stainless steel and tungsten, or a ceramic material such as alumina and zirconia. As shown in FIGS. 1 and 3, the driving element 40 is plate-like (or hemispheroidal). The driving element 40 is fixed onto the top (upper) face of the piezoelectric element 30 in such a manner that the center of the driving element 40 coincides with (is at) the center axis CL of the piezoelectric body 31.

The holding member supporting portion 50 is made of the same piezoelectric material as the piezoelectric body 31. As shown in FIGS. 1 and 3, the holding member supporting portion 50 has a rectangular parallelepiped shape, and stands from the base portion 20 so as to surround the piezoelectric element 30. The holding member supporting portion 50 is apart (separated) from the piezoelectric body 31 by a predetermined distance D. A height (length in the Z-axis direction) of the holding member supporting portion 50 is the same as the height H of the piezoelectric body 31.

As shown in FIGS. 1 and 2, the movable body 60 has a shape, whose upper surface is flat, and whose lower surface is spherical (a part of a spherical shape). A shape (i.e., planar shape) of the movable body 60 when viewed in a direction perpendicular to the upper surface of the movable body 60 is circular. The lower surface of the movable body 60 contacts with the upper surface of the driving element 40, when the height of the piezoelectric element 30 (piezoelectric body 31) is equal to or higher than an "initial height (height of the piezoelectric element 30 when it is not deformed) H". In other words, the lower surface of the movable body 60 is apart (separated) from the driving element 40, when the height of the piezoelectric element 30 is lower than the initial height H.

The movable body holding member 70 is a plate (plate-like member) made of: a metallic material such as copper, stainless steel, nickel, and kovar; a ceramic material such as alumina and zirconia; glass; silicon; or the like. An upper surface of the movable body holding member 70 is a plane (flat surface). When the movable body holding member 70 is fixed to the piezoelectric actuator 10, the upper surface of the movable body holding member 70 is parallel to the X-Y plane. Further, when the movable body 60 is not moved, the upper surface of the movable body holding member 70 and the upper surface of the movable body 60 are on the same plane.

As shown in FIG. 2, a shape (i.e., planar shape) of the movable body holding member 70 when viewed in a direction (Z-axis direction, hereinafter, referred to as a "movable body holding member principal surface perpendicular direction") perpendicular to the upper surface of the movable body holding member 70 is a square having sides parallel to the X-axis and sides parallel to the Y-axis. Accordingly, the movable body holding member 70, when viewed in plan, has a center line DL1 (first center line DL1) which lies in the midst of the sides parallel to Y-axis direction, the center line DL1 being parallel to the X-axis, and a center line DL2 (second center line DL2) which lies in the midst of the sides parallel to the X-axis direction, the center line DL2 being parallel to the Y-axis. The point of intersection between the first center line DL1 and the second center line DL2 is referred to as the "center of the movable body holding member 70".

A thickness of the movable body holding member 70 is relatively large in a region outside of a square SH1 shown by a broken line in FIG. 2, and is relatively small in a region inside of the square SH1. The gravity center of the square SH1 coincides with the center of the movable body holding member 70. Two sides of the square SH1 are parallel to the X-axis, and the other two sides of the square SH1 are parallel to the Y-axis. A length L1 of each of the sides of the square SH1 is larger than the length L of the sides of the piezoelectric element 30. More specifically, the length L1 of the side is equal to a value (L+2D). That is, as shown in FIG. 1, the movable body holding member 70 has a thick portion whose thickness is constant in the outside region of the square SH1. A lower surface of the thick portion is flat, and is fixed onto the upper surface of the holding member supporting portion 50. As shown in FIG. 1, the thick portion is configured to be integral with the movable body holding member 70. Alternatively, the thick portion may be formed separately from the movable body holding member 50, and be adhered or joined to the movable body holding member 70.

When the movable body holding member 70, the piezoelectric element 30, and the holding member supporting portion 50 are viewed in plan (i.e., when the piezoelectric actuator 10 is viewed along the Z-axis direction), the movable body holding member 70 is fixed onto the upper surface of the holding member supporting portion 50 in such a manner that the center of the movable body holding member 70 coincides with the center axis CL of the piezoelectric element 30, and the second center line DL2 of the movable body holding member 70 coincides with the virtual plane VPL1 of the piezoelectric element 30.

The movable body holding member 70 has a gimbal structure. More specifically, the movable body holding member 70 has a circular hole 71 inside of the square SH1 when viewed in plan. The center of the circular hole 71 coincides with the center of the movable body holding member 70. Further, the movable body holding member 70 has a ring portion (annulus portion having a constant width) 72. The center of the ring portion 72 coincides with the center of the movable body holding member 70. The outer diameter of the ring portion 72 is smaller than the diameter of the circular hole 71. The inner diameter of the ring portion 72 is larger than the outer diameter of the movable body 60.

The movable body holding member 70 includes a first hinge portion (beam portion) 73a, a second hinge portion (beam portion) 73b, a third hinge portion (beam portion) 73c, and a fourth hinge portion (beam portion) 73d.

The first hinge portion 73a has a belt-like shape having a longitudinal direction along the X-axis direction. The first hinge portion 73a connects between the "ring portion 72" and an "outer (outside) portion of the circular hole 71 of the movable body holding member 70" at a position in the X-axis positive direction with respect to the second center line DL2. The center line parallel to the longitudinal direction of the first hinge portion 73a coincides with (is on) the first center line DL1 of the movable body holding member 70.

The second hinge portion 73b has a belt-like shape having a longitudinal direction along the X-axis direction. The second hinge portion 73b connects between the "ring portion 72" and the "outer (outside) portion of the circular hole 71 of the movable body holding member 70" at a position in the X-axis negative direction with respect to the second center line DL2. The center line parallel to the longitudinal direction of the second hinge portion 73b coincides with (is on) the first center line DL1 of the movable body holding member 70.

The third hinge portion 73c has a belt-like shape having a longitudinal direction along the Y-axis direction. The third hinge portion 73c connects between the "movable body 60" and the "ring portion 72" at a position in the Y-axis positive direction with respect to the first center line DL1. The center line parallel to the longitudinal direction of the third hinge portion 73c coincides with (is on) the second center line DL2 of the movable body holding member 70.

The fourth hinge portion 73d has a belt-like shape having a longitudinal direction along the Y-axis direction. The fourth hinge portion 73d connects between the "movable body 60" and the "ring portion 72" at a position in the Y-axis negative direction with respect to the first center line DL1. The center line parallel to the longitudinal direction of the fourth hinge portion 73d coincides with (is on) the second center line DL2 of the movable body holding member 70.

Figure 4:
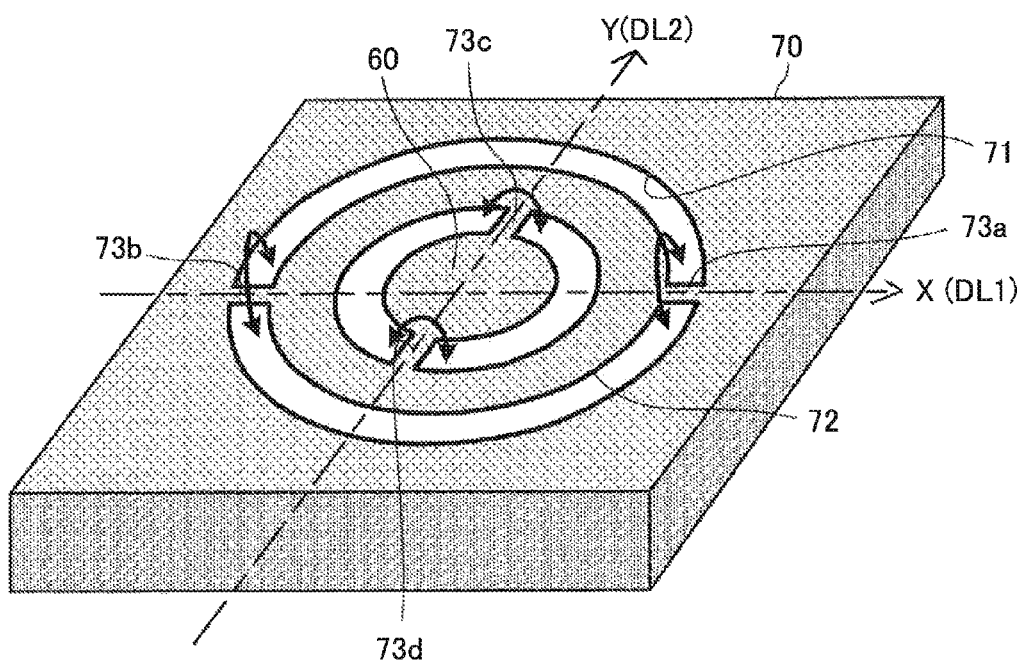
FIG. 4 is a schematic perspective view of the movable body holding member and the movable body, shown in FIG. 1.

Consequently, the movable body 60 is supported by the movable body holding member 70 in such a manner that the movable body 60 can substantially rotate around two axes. That is, as shown in FIG. 4, when the movable body 60 receives a force which causes the movable body 60 to rotate around the X-axis, the first hinge portion 73a and the second hinge portion 73b are twisted around the X-axis. Accordingly, the movable body 60 can rotate around the X-axis. Similarly, when the movable body 60 receives a force which causes the movable body 60 to rotate around the Y-axis, the third hinge portion 73c and the fourth hinge portion 73d are twisted around the Y-axis. Accordingly, the movable body 60 can rotate around the Y-axis.

A supporting column 81 which is cylindrical is fixed onto the upper portion of the movable body 60. A mirror 80 is fixed onto the upper portion of the supporting column 81. Accordingly, an angle of the mirror 80 is varied when the movable body 60 is rotated.

Figure 5:
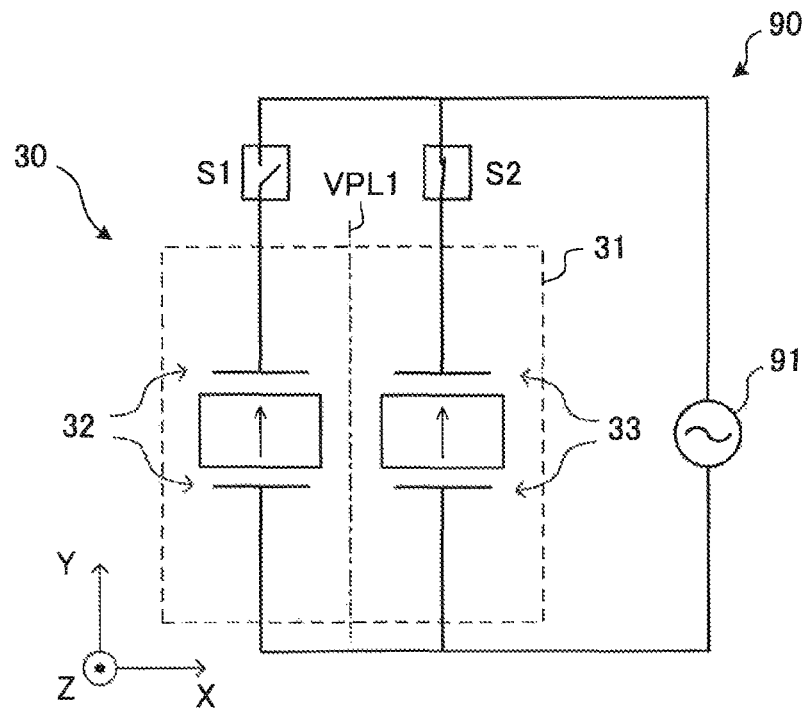
FIG. 5 is a circuit diagram of a driving power supply section for the piezoelectric actuator shown in FIG. 1.
Figure 5:
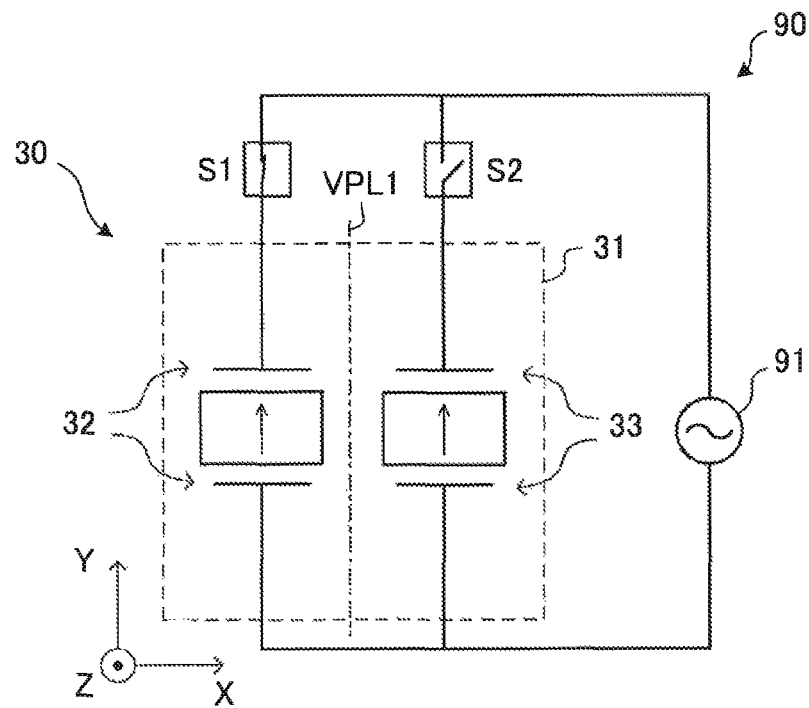

Further, as shown in FIG. 5, the piezoelectric actuator 10 includes a driving power supply section 90. The driving power supply section 90 includes a power source 91 and switching elements S1, S2. When the movable body 60 is moved by the piezoelectric actuator 10, either one of the switching element S1 and the switching element S2 is selectively closed. That is, as shown in (A) of FIG. 5, the switching element S1 is opened while the switching element S2 is closed. In this state, a driving voltage is applied to a pair of the electrodes 33, and thus, a deformation force (force which deforms the piezoelectric body 31) is generated at a portion of the piezoelectric body 31, the portion being in the X-axis positive direction with respect to the virtual plane VPL1. Further, as shown in (B) of FIG. 5, the switching element S1 is closed while the switching element S2 is opened. In this state, the driving voltage is applied to a pair of the electrodes 32, and thus, a deformation force is generated at a portion of the piezoelectric body 31, the portion being in the X-axis negative direction with respect to the virtual plane VPL1.

(Operation)

Figure 6:
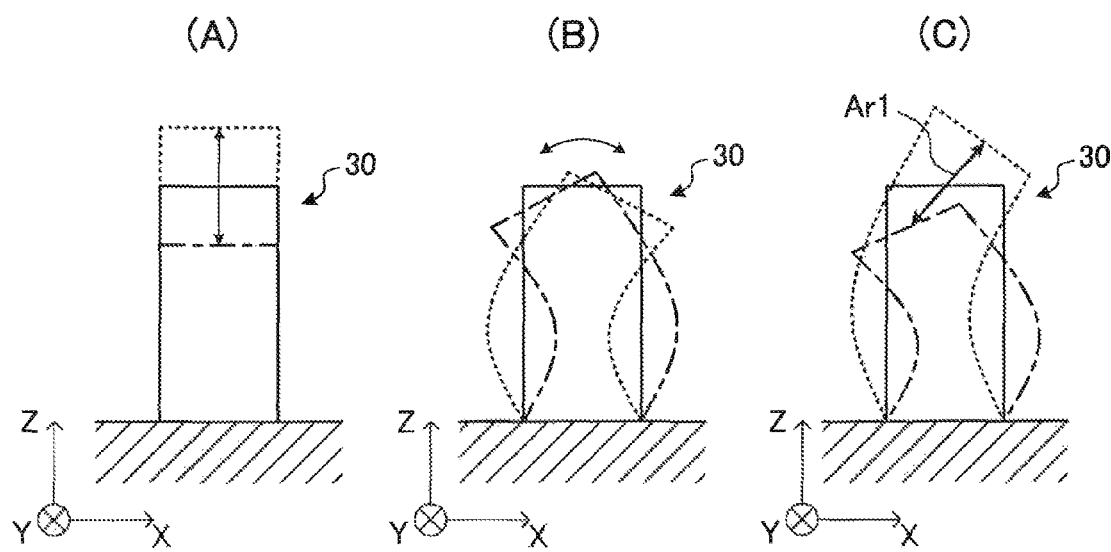
FIG. 6 shows how the piezoelectric actuator shown in FIG. 1 deforms.

An operation of the piezoelectric actuator 10 will next be described. It is now assumed that the switching element S2 is closed and the switching element S1 is opened (i.e., the state where the driving voltage is applied to a pair of the electrodes 33), as shown in (A) of FIG. 5. Under this state, if the driving voltage generated by the power source 91 is a voltage, having a sine wave, and having a frequency equal to the first-order expansion-contraction resonant frequency f1H of the piezoelectric element 30 (piezoelectric body 31), the piezoelectric element 30 greatly expands/contracts in the Z-axis direction, as shown in (A) of FIG. 6.

Meanwhile, if the driving voltage generated by the power source 91 is a voltage, having a sine wave, and having a frequency equal to the second-order bending resonant frequency f2L of the piezoelectric element 30 (piezoelectric body 31), the piezoelectric element 30 is inflected (bends) in the Z-X plane. The second-order bending resonant frequency f2L is usually lower than the first-order expansion-contraction resonant frequency f1H.

In the present example, the driving voltage Vin which the power source 91 actually generates is a voltage (AC voltage), whose wave form is a sine wave, and whose frequency is a "frequency f between the second-order bending resonant frequency f2L and the first-order expansion-contraction resonant frequency f1H" of the piezoelectric element 30 (piezoelectric body 31). Accordingly, when the switching element S2 is closed and the switching element S1 is opened as shown in (A) of FIG. 5, the piezoelectric element 30 (piezoelectric body 31) operates (works) with a vibration in which the bending vibration and the expansion-contraction vibration are superimposed with each other as shown in (C) of FIG. 6. This causes the driving element 40 to move (vibrate) as shown by the arrow Ar1 in (C) of FIG. 6. Consequently, the movable body 60 and the mirror 80 rotate around the Y-axis in a counterclockwise direction.

Figure 7:
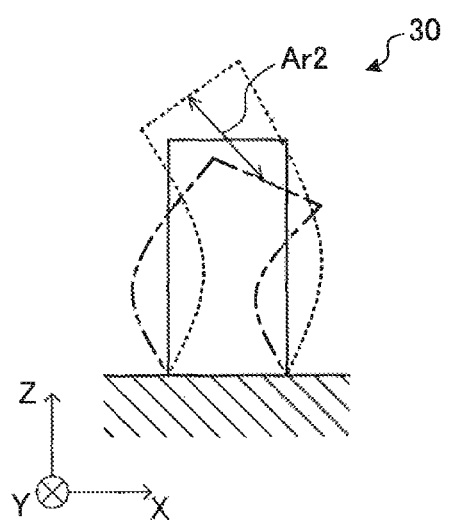
FIG. 7 shows how the piezoelectric actuator shown in FIG. 1 deforms.

In contrast, when it is necessary to rotate the movable body 60 and the mirror 80 around the Y-axis in a clockwise direction, the piezoelectric actuator 10 closes the switching element S1 and opens the switching element S2 as shown in (B) of FIG. 5 to thereby apply the driving voltage Vin to a pair of the electrodes 32. In this case, as shown in FIG. 7, the piezoelectric element 30 (piezoelectric body 31) operates (works) with a vibration in which the bending vibration and the expansion-contraction vibration are superimposed with each other. This causes the driving element 40 to move (vibrate) as shown by the arrow Ar2 shown in FIG. 7. Consequently, the movable body 60 and the mirror 80 rotate around the Y-axis in the clockwise direction.

As described above, the piezoelectric actuator 10 according to the first embodiment is a piezoelectric actuator comprising:

the column-like piezoelectric body 31, whose bottom face is fixed to the base portion 20, and which stands from the base portion 20; and the driving power supply section 90 which applies the driving voltage to the piezoelectric body 31, to move the movable body 60 by using mechanical vibration generated on the top face 31a of the piezoelectric body 31.

The piezoelectric body 31 includes two sets (32, 33) of a pair of electrodes for applying electrical fields to the piezoelectric body 31.

The two sets of a pair of electrodes are formed in such a manner that one set of the two sets is provided to one of the two regions into which the piezoelectric body 31 is divided by the plane (virtual plane VPL1) parallel to the center axis CL of the piezoelectric body 31 (i.e., region in the X-axis negative direction with respect to the virtual plane VPL1), and the other set of the two sets is provided to the other of the two regions (i.e., region in the X-axis positive direction with respect to the virtual plane VPL1).

The driving power supply section 90 is configured so as to apply the driving voltage Vin having the "frequency between the second-order bending resonant frequency of the piezoelectric body and the first-order expansion-contraction resonant frequency of the piezoelectric body" to either one of the two sets of a pair of electrodes, selectively (refer to FIG. 5).

In this manner, the piezoelectric actuator 10 drives the piezoelectric body 31 by using the driving voltage Vin having the "frequency f between the second-order bending resonant frequency f2L of the piezoelectric body 31 and the first-order expansion-contraction resonant frequency f1H of the piezoelectric body 31", and thus, the bending vibration of the piezoelectric body 31 is close to a bending vibration at the second-order bending resonance, and the expansion-contraction vibration of the piezoelectric body 31 is close to an expansion-contraction vibration at the first-order expansion-contraction vibration. Accordingly, the amplitudes of these vibrations can be large, and thus, there is not a big need to enlarge the height of the piezoelectric body 31 (piezoelectric element 30). Further, the first piezoelectric actuator 10 needs to include only a single driving power supply section (driving circuit) 90 which generates the driving voltage Vin, and thus, the number of the drive circuits can be reduced.

Figure 8:
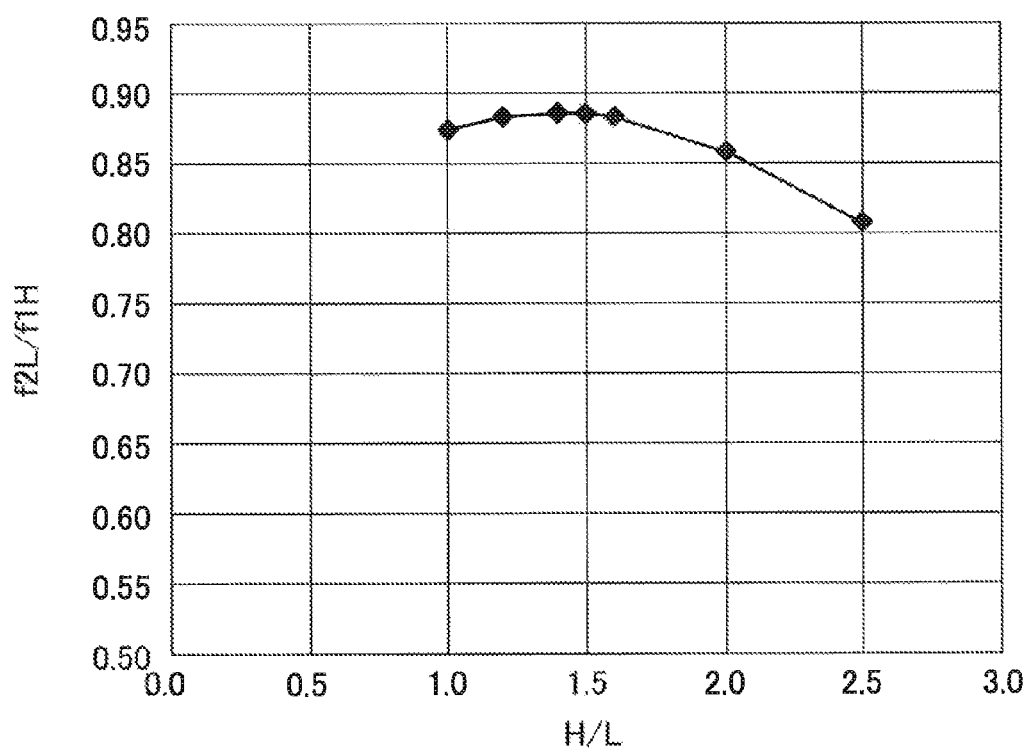
FIG. 8 is a graph showing a relationship between a "ratio H/L of a height H to a length L" of the piezoelectric element shown in FIG. 1 and a "ratio f2L/f1H of the second-order bending resonant frequency f2L to the first-order expansion-contraction resonant frequency f1H"

It should be noted that it is preferable that the ratio H/L of the height H of the piezoelectric body 31 to the length L of one of sides of the bottom face of the piezoelectric body 31 is "equal to or larger than 1 and equal to or smaller than 2". Table 1 and FIG. 8 shows an FEM simulation result on how the "ratio f2L/f1H of the second-order bending resonant frequency f2L to the first-order expansion-contraction resonant frequency f1H" changes with respect to the ratio H/L of the height H to the length L of the bottom side.

TABLE 1

| Ratio H/L of the height H to a length L | Ratio f2L/f1H of the second-order flexion resonant frequency f2L to the first-order expansion-contraction resonant frequency f1H |
|---|---|
| 1.0 | 0.874 |
| 1.2 | 0.883 |
| 1.4 | 0.886 |
| 1.5 | 0.885 |
| 1.6 | 0.882 |
| 2.0 | 0.858 |
| 2.5 | 0.806 |
| 4.0 | 0.627 |

According to the simulation result, it can be understood that the ratio f2L/f1H becomes "equal to or larger than 0.85 (and equal to or smaller than 0.90)" when the ratio H/L is "equal to or larger than 1 and equal to or smaller than 2". That is, when the ratio H/L is "equal to or larger than 1 and equal to or smaller than 2", the second-order bending resonant frequency f2L of the piezoelectric body 31 becomes (can be made) closer to the first-order expansion-contraction resonant frequency of the piezoelectric body 31. This will allow the bending vibration of the piezoelectric body 31 to become closer to the bending vibration at the second-order bending resonance, and will allow the expansion-contraction vibration of the piezoelectric body 31 to become closer to the expansion-contraction vibration at the first-order expansion-contraction vibration. Consequently, the amplitudes of the vibration of the piezoelectric body 31 can be increased, and thus, it is possible to reduce the height of the piezoelectric body 31 (piezoelectric element 30).

<Second Embodiment>

Next will be described a piezoelectric actuator according to a second embodiment of the present invention with reference to FIGS. 9-11. The piezoelectric actuator according to the second embodiment is different from the piezoelectric actuator 10 according to the first embodiment only in that the piezoelectric element 30 of the piezoelectric actuator 10 is replaced with (by) a piezoelectric actuator 100, and the driving power supply section 90 is replaced with (by) a driving power supply section 120. Accordingly, hereinafter, those differences will be mainly described.

The piezoelectric actuator 100 includes a piezoelectric body 101. The piezoelectric actuator 100 is the same as the piezoelectric actuator 30 except for electrode layer groups (111-114) formed in the piezoelectric body 101. The piezoelectric body 101 is polarized in (along) the Y-axis position direction, More specifically, the piezoelectric element 100 includes four sets of electrode layer groups 111, 112, 113, and 114. As shown in FIG. 9, the electrode layer group 111 includes: a plurality of first electrode layers shown by solid lines; and a plurality of second electrode layers shown by broken lines. The electrode layer group 111 is formed in one of four regions (i.e., region in the X-axis negative direction with respect to a virtual plane VPL1 and in the Y-axis positive direction with respect to a virtual plane VPL2). The four regions are formed by dividing the piezoelectric body 101 into four portions by (with) the "virtual plane VPL1, which is a virtual plane including the center axis CL and is parallel to the Z-Y plane" and the "virtual plane VPL2, which is a virtual plane including the center axis CL and is parallel to the Z-X plane". The virtual plane VPL2 intersects with the virtual plane VPL1 at a right angle.

A plurality of the first electrode layers of the electrode layer group 111 are electrically connected (with each other) by an unillustrated first connection layer. A plurality of the second electrode layers of the electrode layer group 111 are electrically connected (with each other) by an unillustrated second connection layer. A layer surface of each of the first electrode layers is parallel to the Z-X plane. A layer surface of each of the second electrode layers is also parallel to the Z-X plane. Accordingly, the first electrode layer and the second electrode layer are parallel to each other. Each of heights (lengths in the Z-axis direction) of the first electrode layers is slightly smaller than the height H of the piezoelectric body 101. Each of heights of the second electrode layers is slightly smaller than the height H of the piezoelectric body 101. Each of widths (lengths in the X-axis direction) of the first electrode layers is slightly smaller than half (L/2) of the length L of a base of the piezoelectric body 101. Each of widths of the second electrode layers is slightly smaller than half (L/2) of the length L of the base of the piezoelectric body 101. The first electrode layer and the second electrode layer are arranged alternately so as to be opposed to each other. Therefore, the electrode layer group 111 can be said to be as a "pair of electrodes comprising the first electrode layer and the second electrode layer".

Figure 9:
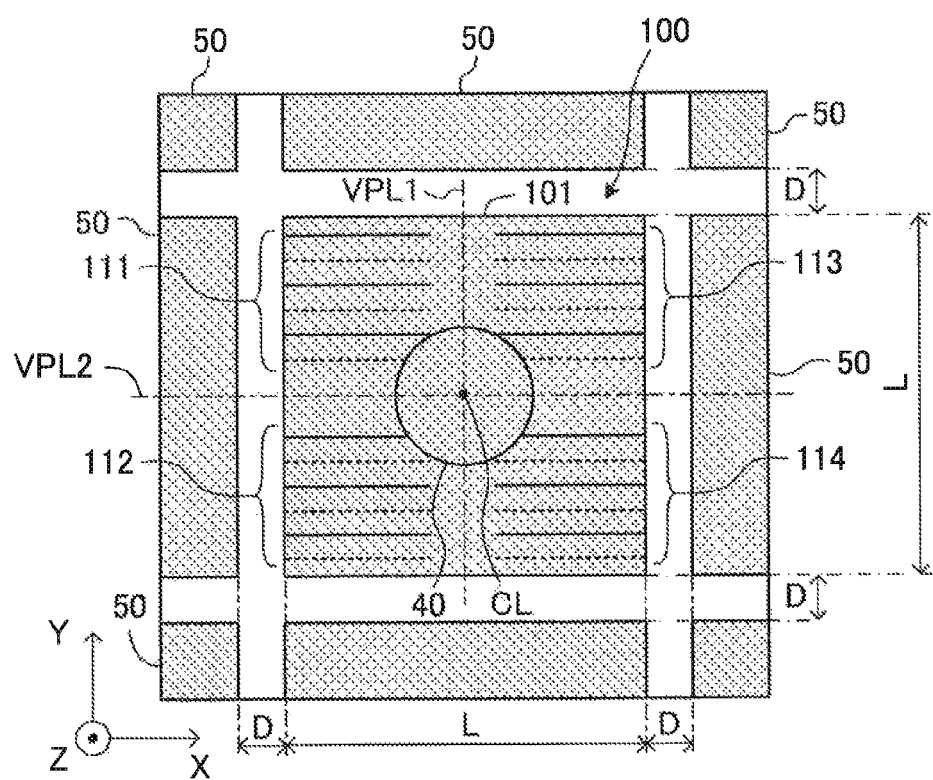
FIG. 9 is a plan view of "a piezoelectric element, a driving element, and a holding member supporting portion" of a piezoelectric actuator according to a second embodiment of the present invention.

As shown in FIG. 9, the electrode layer group 112 includes: a plurality of third electrode layers shown by solid lines; and a plurality of fourth electrode layers shown by broken lines. The electrode layer group 112 is formed in the other one of the four regions (i.e., region in the X-axis negative direction with respect to the virtual plane VPL1 and in the Y-axis negative direction with respect to the virtual plane VPL2) into which the piezoelectric body 101 is divided by (with) the virtual plane VPL1 and the virtual plane VPL2.

A plurality of the third electrode layers of the electrode layer group 112 are electrically connected (with each other) by an unillustrated third connection layer. A plurality of the fourth electrode layers of the electrode layer group 112 are electrically connected (with each other) by an unillustrated fourth connection layer. A layer surface of each of the third electrode layers is parallel to the Z-X plane. A layer surface of each of the fourth electrode layers is also parallel to the Z-X plane. Accordingly, the third electrode layer and the fourth electrode layer are parallel to each other. Each of heights (lengths in the Z-axis direction) of the third electrode layers is slightly smaller than the height H of the piezoelectric body 101. Each of heights of the fourth electrode layers is slightly smaller than the height H of the piezoelectric body 101. Each of widths (lengths in the X-axis direction) of the third electrode layers is slightly smaller than half (L/2) of the length L of the base of the piezoelectric body 101. Each of widths of the fourth electrode layers is slightly smaller than half (L/2) of the length L of the base of the piezoelectric body 101. The third electrode layer and the fourth electrode layer are arranged alternately so as to be opposed to each other. Therefore, the electrode layer group 112 can be said to be as a "pair of electrodes comprising the third electrode layer and the fourth electrode layer".

As shown in FIG. 9, the electrode layer group 113 includes: a plurality of fifth electrode layers shown by solid lines; and a plurality of sixth electrode layers shown by broken lines. The electrode layer group 113 is formed in the other one of the four regions (i.e., region in the X-axis positive direction with respect to the virtual plane VPL1 and in the Y-axis positive direction with respect to the virtual plane VPL2) into which the piezoelectric body 101 is divided by (with) the virtual plane VPL1 and the virtual plane VPL2.

A plurality of the fifth electrode layers of the electrode layer group 113 are electrically connected (with each other) by an unillustrated fifth connection layer. A plurality of the sixth electrode layers of the electrode layer group 113 are electrically connected (with each other) by an unillustrated sixth connection layer. A layer surface of each of the fifth electrode layers is parallel to the Z-X plane. A layer surface of each of the sixth electrode layers is also parallel to the Z-X plane. Accordingly, the fifth electrode layer and the sixth electrode layer are parallel to each other. Each of heights (lengths in the Z-axis direction) of the fifth electrode layers is slightly smaller than the height H of the piezoelectric body 101. Each of heights of the sixth electrode layers is slightly smaller than the height H of the piezoelectric body 101. Each of widths (lengths in the X-axis direction) of the fifth electrode layers is slightly smaller than half (L/2) of the length L of the base of the piezoelectric body 101. Each of widths of the sixth electrode layers is slightly smaller than half (L/2) of the length L of the base of the piezoelectric body 101. The fifth electrode layer and the sixth electrode layer are arranged alternately so as to be opposed to each other. Therefore, the electrode layer group 113 can be said to be as a "pair of electrodes comprising the fifth electrode layer and the sixth electrode layer".

As shown in FIG. 9, the electrode layer group 114 includes: a plurality of seventh electrode layers shown by solid lines; and a plurality of eighth electrode layers shown by broken lines. The electrode layer group 114 is formed in the other one of the four regions (i.e., region in the X-axis positive direction with respect to the virtual plane VPL1 and in the Y-axis negative direction with respect to the virtual plane VPL2) into which the piezoelectric body 101 is divided by (with) the virtual plane VPL1 and the virtual plane VPL2.

A plurality of the seventh electrode layers of the electrode layer group 114 are electrically connected (with each other) by an unillustrated seventh connection layer. A plurality of the eighth electrode layers of the electrode layer group 114 are electrically connected (with each other) by an unillustrated eighth connection layer. A layer surface of each of the seventh electrode layers is parallel to the Z-X plane. A layer surface of each of the eighth electrode layers is also parallel to the Z-X plane. Accordingly, the seventh electrode layer and the eighth electrode layer are parallel to each other. Each of heights (lengths in the Z-axis direction) of the seventh electrode layers is slightly smaller than the height H of the piezoelectric body 101. Each of heights of the eighth electrode layers is slightly smaller than the height H of the piezoelectric body 101. Each of widths (lengths in the X-axis direction) of the seventh electrode layers is slightly smaller than half (L/2) of the length L of the base of the piezoelectric body 101. Each of widths of the eighth electrode layers is slightly smaller than half (L/2) of the length L of the base of the piezoelectric body 101. The seventh electrode layer and the eighth electrode layer are arranged alternately so as to be opposed to each other. Therefore, the electrode layer group 114 can be said to be as a "pair of electrodes comprising the seventh electrode layer and the eighth electrode layer".

Figure 10:
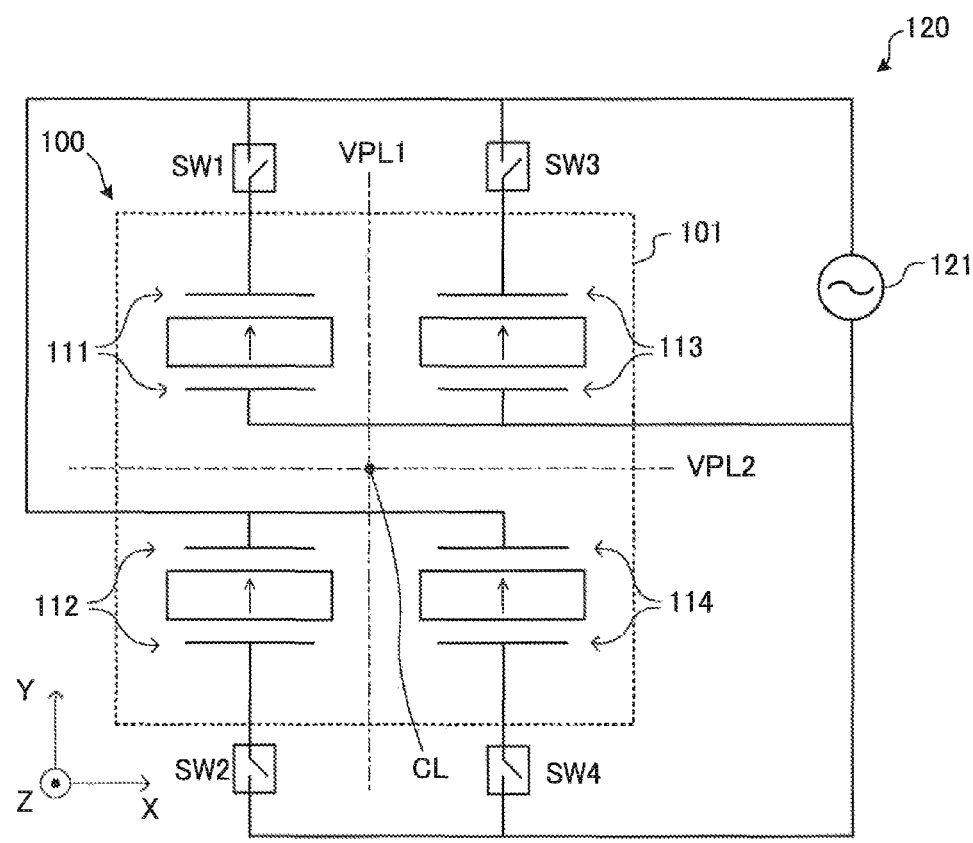
FIG. 10 is a circuit diagram of a driving power supply section for the piezoelectric actuator according to the second embodiment of the present invention.

As shown in FIG. 10, the driving power supply section 120 includes a power source 121 and four of switching elements SW1, SW2, SW3, and SW4. The driving power source 121 outputs the same driving voltage Vin (having the frequency f) as the power source 91. When the movable body 60 is moved by the piezoelectric actuator according to the second embodiment, the switching elements SW1, SW2, SW3, and SW4 are closed as follows.

Figure 11:
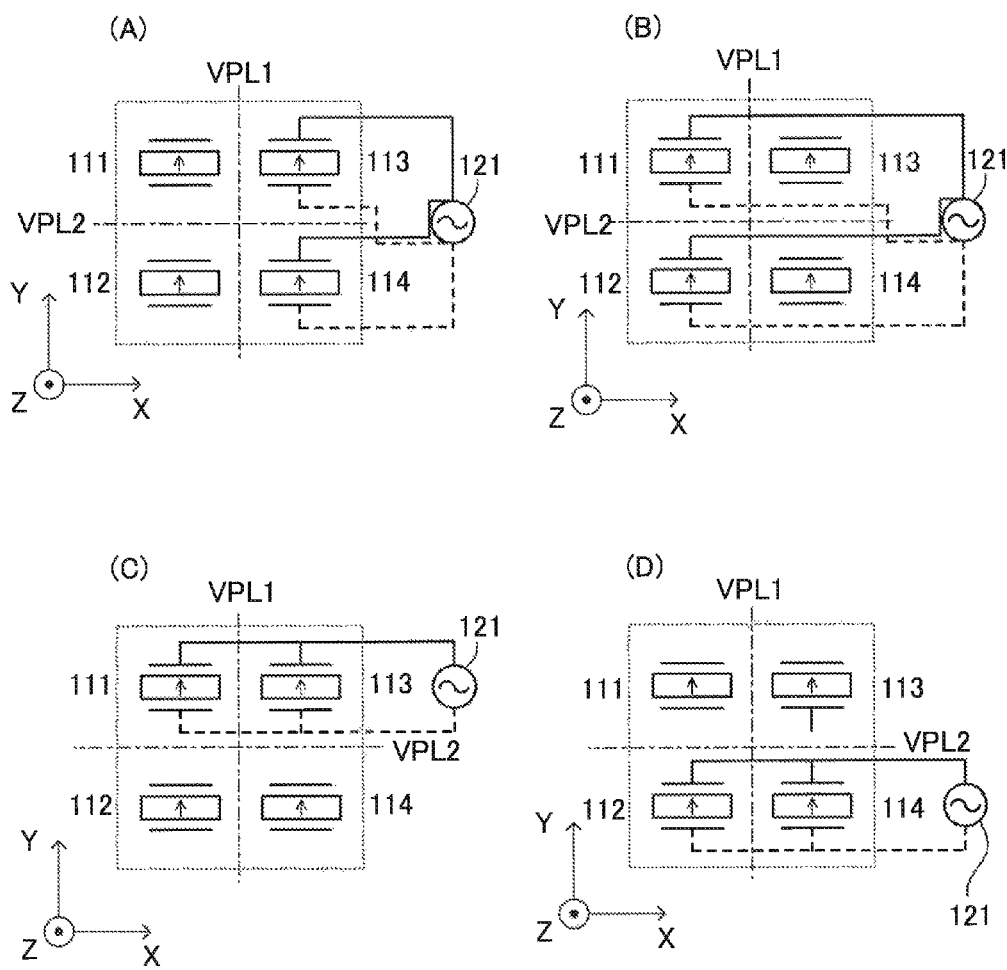
FIG. 11 is a circuit diagram showing a connection state when the piezoelectric actuator according to the second embodiment of the present invention is operated.

(A) When the switching elements SW3 and SW4 are closed, the switching elements SW1 and SW2 are opened (refer to (A) of FIG. 11). Under this state, the driving voltage Vin is applied to a pair of the electrode 113 and a pair of the electrode 114. Accordingly, as shown in (C) of FIG. 6, the piezoelectric element 100 operates (works) with a vibration in which the bending vibration and the expansion-contraction vibration are superimposed with each other. This causes the driving element 40 to move (vibrate) as shown by the arrow Ar1 in (C) of FIG. 6. Consequently, the movable body 60 and the mirror 80 rotate around the Y-axis in a counterclockwise direction.

(B) When the switching elements SW1 and SW2 are closed, the switching elements SW3 and SW4 are opened (refer to (B) of FIG. 11). Under this state, the driving voltage Vin is applied to a pair of the electrode 111 and a pair of the electrode 112. Accordingly, as shown in FIG. 7, the piezoelectric element 100 operates (works) with a vibration in which the bending vibration and the expansion-contraction vibration are superimposed with each other. This causes the driving element 40 to move (vibrate) as shown by the arrow Ar2 in FIG. 7. Consequently, the movable body 60 and the mirror 80 rotate around the Y-axis in a clockwise direction.

(C) When the switching elements SW1 and SW3 are closed, the switching elements SW2 and SW4 are opened (refer to (C) of FIG. 11). Under this state, the driving voltage Vin is applied to a pair of the electrode 111 and a pair of the electrode 113. Accordingly, the piezoelectric element 100 operates (works) with a vibration in which the bending vibration and the expansion-contraction vibration are superimposed with each other. Consequently, the movable body 60 and the mirror 80 rotate around the X-axis in a counterclockwise direction.

(D) When the switching elements SW2 and SW4 are closed, the switching elements SW1 and SW3 are opened (refer to (D) of FIG. 11). Under this state, the driving voltage Vin is applied to a pair of the electrode 112 and a pair of the electrode 114. Accordingly, the piezoelectric element 100 operates (works) with a vibration in which the bending vibration and the expansion-contraction vibration are superimposed with each other. Consequently, the movable body 60 and the mirror 80 rotate around the X-axis in a clockwise direction.

As described above, the piezoelectric actuator according to the second embodiment is a piezoelectric actuator comprising:

the column-like piezoelectric body 101, whose bottom face is fixed to the base portion 20, and which stands from the base portion 20; and the driving power supply section 120 which applies the driving voltage to the piezoelectric body 101;

to move the movable body 60 by using mechanical vibration generated on the top face of the piezoelectric body 101.

The piezoelectric body 101 includes four sets of a pair of electrodes (111, 112, 113, 114) for applying electrical fields to the piezoelectric body 101.

The four sets of a pair of electrodes are formed in such a manner that the four sets are provided to the four regions one by one. The four regions are formed by dividing the piezoelectric body 101 by the two planes (virtual plane VPL1 and virtual plane VPL2), each being parallel to the center axis CL of the piezoelectric body 101, and intersecting each other.

The driving power supply section 120 is configured so as to selectively apply the driving voltage Vin having the "frequency between the second-order bending resonant frequency of the piezoelectric body and the first-order expansion-contraction resonant frequency of the piezoelectric body" to any (arbitrary) two sets of the four sets of a pair of electrodes, the two sets being formed in any (arbitrary) two regions that are adjacent to each other of the four regions (refer to FIG. 11).

According to this embodiment, the "vibration in which the bending vibration and the expansion-contraction vibration are superimposed with each other" is generated in the piezoelectric body 101 by using the driving power supply section 120. Consequently, the driving element 40 formed on the top face of the piezoelectric body 101 is caused to substantially vibrate in four directions, depending on the selected two sets of a pair of electrodes.

Further, similarly to the piezoelectric actuator 10 according to the first embodiment, the piezoelectric actuator according to the second embodiment drives the piezoelectric body 101 with (by) the driving voltage Vin having the "frequency between the second-order bending resonant frequency and the first-order expansion-contraction resonant frequency", and therefore, the bending vibration of the piezoelectric body 101 is close to a bending vibration at the second-order bending resonance, and the expansion-contraction vibration of the piezoelectric body 101 is close to an expansion-contraction vibration at the first-order expansion-contraction vibration. Accordingly, amplitudes of these vibrations can be large, and thus, there is not a big need to enlarge the height of the piezoelectric body 101 (piezoelectric element 100). Further, the second piezoelectric actuator according to the second embodiment needs to include only the single driving power supply section (driving circuit) 120 which generates the driving voltage Vin having the "frequency between the second-order bending resonant frequency and the first-order expansion-contraction resonant frequency of the piezoelectric body 101", and thus, the number of the drive circuits can be reduced.

It should be noted that the piezoelectric body 101 is preferably configured, similarly to the piezoelectric body 31, in such a manner that the ratio H/L of the height H of the piezoelectric body 101 to the length L of one of sides of the bottom face of the piezoelectric body 101 is "equal to or larger than 1 and equal to or smaller than 2". According to this configuration, the second-order bending resonant frequency of the piezoelectric body 101 can be made closer to the first-order expansion-contraction resonant frequency of the piezoelectric body 101. This will allow the bending vibration of the piezoelectric body 101 to become closer to the bending vibration at the second-order bending resonance, and will allow the expansion-contraction vibration of the piezoelectric body 101 to become closer to the expansion-contraction vibration at the first-order expansion-contraction vibration. Consequently, the amplitudes of these vibrations of the piezoelectric body 101 can be large, and thus, it is possible to reduce the height of the piezoelectric body 101 (piezoelectric element 100).

The piezoelectric actuator according to the second embodiment can be expressed as a piezoelectric actuator configured in such a manner that it includes four sets of a pair of the electrodes, each of which is formed to be (exist, be provided) in each of regions, each belonging to first quadrant to fourth quadrant (one per a quadrant), wherein the quadrants (first to fourth quadrants) are defined, in a cross section obtained by cutting the piezoelectric element 101 by (with) a plane (plane parallel to the X-Y plane) perpendicular to the center axis CL of the piezoelectric element 101, by the X-axis passing through an origin coinciding with the center line CL of the piezoelectric body 101 and by the Y-axis passing through the origin and being perpendicular to the X-axis.

In addition, when the piezoelectric actuator according to the second embodiment moves the movable body, the driving power supply section 120 is configured so as to realize one of states of first state to fourth state.

In the first state, the driving voltage Vin having the frequency between the second-order bending resonant frequency and the first-order expansion-contraction resonant frequency is applied to two sets of a pair of the electrodes provided in the first quadrant and in the second quadrant, and the driving voltage Vin is not applied to the other sets of a pair of the electrodes (refer to state shown in (C) of FIG. 11).

In the second state, the driving voltage Vin is applied to two sets of a pair of the electrodes provided in the second quadrant and in the third quadrant, and the driving voltage Vin is not applied to the other sets of a pair of the electrodes (refer to state shown in (B) of FIG. 11).

In the third state, the driving voltage Vin is applied to two sets of a pair of the electrodes provided in the third quadrant and in the fourth quadrant, and the driving voltage Vin is not applied to the other sets of a pair of the electrodes (refer to state shown in (D) of FIG. 11).

In the fourth state, the driving voltage Vin is applied to two sets of a pair of the electrodes provided in the fourth quadrant and in the first quadrant, and the driving voltage Vin is not applied to the other sets of a pair of the electrodes (refer to state shown in (A) of FIG. 11).

The present invention is not limited to the aforementioned embodiments, and various modifications may be made within the scope of the present invention. For example, both the piezoelectric actuators according to the first embodiment and the second embodiment can be manufactured and used as an actuator array in which a member (refer to FIG. 12) formed by arranging/disposing a plurality of sets of "the movable body 60 and the movable body holding member 70" in the Y-axis direction (longitudinal direction) and in the X-axis direction (transverse direction) with a substantially constant interval (so as to be in a lattice pattern), is superimposed (layered) on a member (refer to FIG. 13) formed by arranging/disposing a plurality of sets of "the base portion 20, the piezoelectric element 30, the driving element 40, and the holding member supporting portion 50" in the Y-axis direction (longitudinal direction) and in the X-axis direction (transverse direction) with the substantially constant interval (so as to be in the lattice pattern).

That is, the piezoelectric actuators according to the first embodiment or to the second embodiment can be fabricated and used as the actuator array in which each of the actuators is arranged so as to be in the lattice pattern (wherein, the actuators lie adjacent to each other with the substantially constant interval in the longitudinal direction and in the transverse direction).

Further, the movable body 60 is one which rotates, however, it may be one that can be moved in either the X-axis direction or the Y-axis direction only, or it may be one that moves (translates) in the X-Y plane.

In addition, in each of the piezoelectric actuators according to the embodiments, the electrode layers formed in the piezoelectric body 31 or in the piezoelectric body 101 are parallel to the Z-X plane, however, they may be parallel to the X-Y plane. Further, each of the shapes of the piezoelectric body 31 and the shape of the piezoelectric body 101 is a square column, however, it may be a variety of prisms (regular prisms) such as a hexagonal prism (regular hexagonal prism), and an octagon prism (regular octagon prism), or it may be a circular cylinder.

The invention claimed is:

1. A piezoelectric actuator comprising:
a column-like piezoelectric body, whose bottom face is fixed to a base portion, and which stands from said base portion; and
a driving power supply section for applying a driving voltage to said piezoelectric body;
so as to move a movable body by using mechanical vibration generated on a top face of said piezoelectric body, wherein,
said piezoelectric body includes two sets of a pair of electrodes for applying electrical fields to said piezoelectric body;
said two sets of a pair of electrodes are formed in such a manner that each of said two sets is provided to each of two regions into which said piezoelectric body is divided by a plane parallel to the center axis of said piezoelectric body; and
said driving power supply section is configured so as to apply a driving voltage having a frequency between the second-order bending resonant frequency of said piezoelectric body and the first-order expansion-contraction resonant frequency of said piezoelectric body to either one of said two sets of a pair of electrodes, selectively.

2. The piezoelectric actuator according to claim 1, wherein said piezoelectric body is a square column, and is adjusted in such a manner that the ratio H/L of the height H of said piezoelectric body to the length L of one of sides of said bottom face of said piezoelectric body is equal to or larger than 1 and equal to or smaller than 2.

3. A piezoelectric actuator array comprising a plurality of said piezoelectric actuators, each according to claim 1, wherein a plurality of said piezoelectric actuators are arranged so as to be in a lattice pattern.

4. A piezoelectric actuator array comprising a plurality of said piezoelectric actuators, each according to claim 2, wherein a plurality of said piezoelectric actuators are arranged so as to be in a lattice pattern.

5. A piezoelectric actuator comprising:
- a column-like piezoelectric body, whose bottom face is fixed to a base portion, and which stands from said base portion; and
- a driving power supply section for applying a driving voltage to said piezoelectric body;
- so as to move a movable body by using mechanical vibration generated on a top face of said piezoelectric body, wherein,
- said piezoelectric body includes four sets of a pair of electrodes for applying electrical fields to said piezoelectric body;
- said four sets of a pair of electrodes are formed in such a manner that each of said four sets is provided to each of four regions into which said piezoelectric body is divided by two of planes, each of which is parallel to the center axis of said piezoelectric body, and which intersect with each other; and
- said driving power supply section is configured so as to selectively apply a driving voltage having a frequency between the second-order bending resonant frequency of said piezoelectric body and the first-order expansion-contraction resonant frequency of said piezoelectric body to arbitrary two sets of said four sets of a pair of electrodes, said arbitrary two sets being formed in arbitrary two regions that are adjacent to each other in said four regions.

6. The piezoelectric actuator according to claim 5, wherein said piezoelectric body is a square column, and is adjusted in such a manner that the ratio H/L of the height H of said piezoelectric body to the length L of one of sides of said bottom face of said piezoelectric body is equal to or larger than 1 and equal to or smaller than 2.

7. A piezoelectric actuator array comprising a plurality of said piezoelectric actuators, each according to claim 5, wherein a plurality of said piezoelectric actuators are arranged so as to be in a lattice pattern.

8. A piezoelectric actuator array comprising a plurality of said piezoelectric actuators, each according to claim 6, wherein a plurality of said piezoelectric actuators are arranged so as to be in a lattice pattern.

* * * * *